United States Patent [19]

Hall et al.

[11] Patent Number: 5,325,391
[45] Date of Patent: Jun. 28, 1994

[54] RECIRCULATING WEDGES FOR METAL-VAPOR PLASMA TUBES

[75] Inventors: Jerome P. Hall, Livermore; Robert M. Sawvel, Modesto; Vaughn G. Draggoo, Livermore, all of Calif.

[73] Assignee: The United States of America as represented by the United States Department of Energy, Washington, D.C.

[21] Appl. No.: 72,308

[22] Filed: Jun. 9, 1993

[51] Int. Cl.⁵ .......................... H01S 3/227; H01S 3/03
[52] U.S. Cl. ........................................ 372/61; 372/56
[58] Field of Search ................................. 372/56, 61

[56] References Cited

U.S. PATENT DOCUMENTS 3,654,567  4/1972  Hodgson .
4,247,830  1/1981  Karras et al. .
4,442,523  4/1984  Bricks .
4,710,938  12/1987 Fuke et al. .

FOREIGN PATENT DOCUMENTS 6197885  5/1986  Japan .

Primary Examiner—Rodney B. Bovernick
Assistant Examiner—Robert McNutt
Attorney, Agent, or Firm—Isabelle R. McAndrews; Miguel A. Valdes; William R. Moser

[57] ABSTRACT

A metal vapor laser is disclosed that recycles condensed metal located at the terminal ends of a plasma tube back toward the center of the tube. A pair of arcuate wedges are incorporated on the bottom of the plasma tube near the terminal ends. The wedges slope downward toward the center so that condensed metal may be transported under the force of gravity away from the terminal ends. The wedges are curved to fit the plasma tube to thereby avoid forming any gaps within the tube interior.

7 Claims, 3 Drawing Sheets

RECIRCULATING WEDGES FOR METAL-VAPOR PLASMA TUBES

The United States Government has rights in this invention pursuant to Contract No. W-7405-ENG-48 between the United States Department of Energy and the University of California for the operation of Lawrence Livermore National Laboratory.

BACKGROUND OF THE INVENTION

This invention pertains to metal vapor lasers generally, and in particular to the plasma tube housing of the laser. The disclosed plasma tube is especially notable for its ability to recycle condensed metal vapor.

Plasma tubes are the components of a laser that house the lasing medium. In metal vapor lasers, this medium is a metal that has been vaporized. Although any metal will, in theory, support lasing, some are much more commonly used. To date, copper has been the most popular choice. Other common lasing media include lead and cadmium. When excited, the lasing medium can emit coherent laser light at a particular wavelength. Copper vapor lasers, for example, typically produce light in the green region of the visible spectrum. Lead vapor lasers generate light in the red region.

Conventional plasma tubes are simply cylindrical tubes. A solid piece of the lasing media is placed at the center of the plasma tube before it is put into operation. An electric discharge along the length of the plasma tube vaporizes and excites the metal atoms. During lasing, the center of the plasma tube becomes the hottest region and it is there that the metal most easily vaporizes. However, the metal vapor continuously diffuses throughout the entire volume of the plasma tube where the metal vapor cools and often condenses. The heat generated by the discharge causes most of the condensed metal drops to ultimately revaporize. However, since the ends of the tube are cooler than the center of the tube, some of the metal condensing at the ends is not revaporized and thus tends to accumulate there. Since the accumulated metal cannot readily be used to support lasing, this "migration" of the metal towards the ends of the plasma tube shortens the useful life of the laser before the lasing media must be recharged.

This accumulation also degrades the plasma tube performance in other ways. For example, the insulation of the plasma tube is compromised, necessitating an increased power input. Also, the accumulation of deposited material gradually decreases the inside diameter of the plasma tube end portions. Since a substantial percentage of the lasing energy generated in high energy lasers accumulates very close to the walls of the plasma tube, a decrease in tube diameter results in a corresponding decrease in laser output.

It has been recognized in the art that accumulation of the metal lasing media at the cool ends of plasma tubes creates some problems. A few preliminary attempts to rectify the problem have been made. Most of those disclosed are means for forcing the metal vapor back to the center of a plasma tube. For example, U.S. Pat. No. 4,710,938 discloses the use of anodes placed near the Brewster windows (at the ends of the laser tube) to "blow" the vapor back toward the center of the tube. However, this blowing actually causes some condensation on the end portions of the hollow tubes. This is the exact problem that the present invention seeks to avoid.

Wicks are also sometimes used to recycle condensed metal vapor. This approach is disclosed in U.S. Pat. Nos. 4,442,523, 3,654,567, and 4,247,830. The wicks are typically porous materials which draw condensed metal vapor back toward the center of the tube by capillary action. Wicks, however, require sophisticated materials that must have both carefully controlled porosity and resistance to the high temperatures of lasing.

Japanese Application No. 59-219210 discloses a plasma tube with symmetrically tapered ends designed to direct solidified metal from the ends of a plasma tube back toward the center. Although this device will permit recycling of metal condensed at the ends, it suffers from incomplete utilization of the laser periphery. As mentioned above, most of the power produced within the plasma tube resides along the edges of the tube itself. Since this region is partially occluded by the tapering about the entire perimeter, significant power reduction will result. Thus, lasers built in accordance with the teachings of Japanese Application No. 59-219210 suffer from an unnecessary loss of efficiency.

SUMMARY OF THE INVENTION

Accordingly, a primary objective of this invention is to extend the lifetime of metal vapor plasma tubes without substantially occluding their end regions.

Another objective is to prevent condensed metal vapor from accumulating at the ends of a plasma tube.

To achieve the foregoing and other objects, in accordance with the purpose of the invention, wedges are incorporated into the bottom of the otherwise cylindrical plasma tube. The direction of taper is away from the ends of the tube to facilitate transport of condensed metal vapor back to the center of the laser tube.

Since the wedges taper only the bottom of the plasma tube, this invention does not unduly constrict the plasma tube periphery and therefore does not substantially remove power from the laser. The wedges are designed to cover only a small arc of the tube perimeter. No more is necessary, since the goal is to facilitate transport of molten metal back to the hot zone at the center of the tube. All of the condensed metal, whether it forms on the top, bottom or sides of the tube, will ultimately gravitate to the bottom of the tube.

In a preferred embodiment of this invention, the wedges have a slope in the range of 1 to 2.5 degrees. The wedges may take the form of inserts or may be integrally formed with the plasma tube itself.

BRIEF DESCRIPTION OF THE DRAWINGS

The novel features of this invention are delineated with particularity in the appended claims. When viewed in the context of the problem it remedies, this invention can be understood more completely by referring to the accompanying drawings in which:

DETAILED DESCRIPTION OF THE INVENTION

Figure 1A:
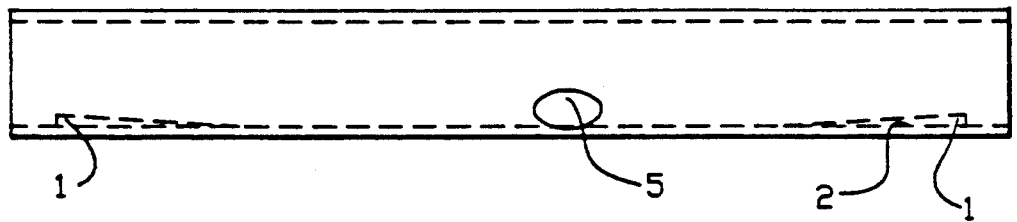
FIG. 1A is an axial section view of a metal vapor plasma tube formed in accordance with the present invention.
Figure 1B:
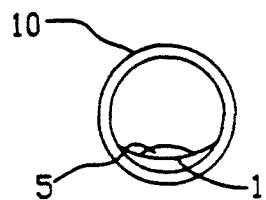
FIG. 1B is a cross section view of the plasma tube shown in FIG. 1A.

Referring to FIGS. 1A and 1B, plasma tube 10 is a cylindrical shell composed of a high density refractory material such as alumina. Two arcuate wedges 1, also preferably composed of a high density refractory material, are disposed at opposite ends of the plasma tube. As the drawings show, the two wedges face each other and are sloped away from the ends of the plasma tube toward the tube's center region.

Before the laser is put into operation, a solid lump of metal 5 is placed in the center of the plasma tube. When the tube is heated, as for example by an electric discharge, the lump of metal 5 first melts and ultimately vaporizes. Once the metal atoms are vaporized, a discharge or other pumping means excites some of the metal vapor atoms into higher energy states. When a sufficient number of these metal atoms reach the excited state, a population inversion results and lasing can proceed.

Figure 2:
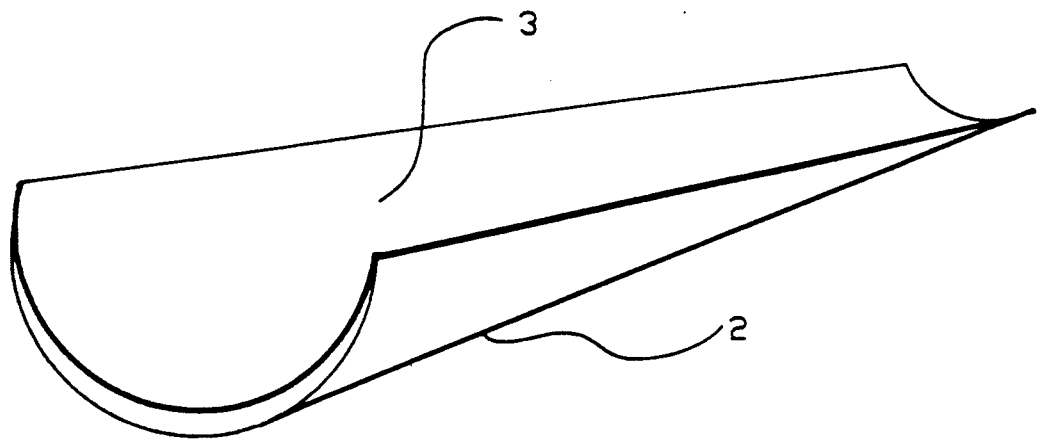
FIG. 2 is a perspective view of a wedge insert to be incorporated in plasma tubes of the present invention.

Now referring to FIG. 2 in conjunction with FIGS. 1A and 1B, it can be seen that the wedges are shaped to conform to the curvature of the bottom of the plasma tube. This is to ensure that no gaps form between the tube and the wedges. Such gaps could potentially provide a harbor for the condensed metal. Thus, the bottom surface 2 of the wedges should have a radius that is identical with that of the inside of the plasma tube. The upper side 3 of the wedges, however, should have a larger radius of curvature to permit a continuous, gap-free, inner tube surface as shown in FIG. 1B. Like the contour of the bottom of the wedges, this constraint also serves to eliminate regions where the condensed metal might accumulate.

A characteristic angle of inclination is associated with the wedge. As shown in FIG. 1A, this is the angle formed between the top side of the wedge and the bottom of the plasma tube. In addition to this angle, the fraction of the inside circumference over which the wedge covers the tube can be specified. This is shown as angle $\theta$ in FIG. 1B.

As noted earlier, a substantial percentage of the lasing energy accumulates close to the walls of the plasma tube. Thus, very small wedges are desirable. To the extent that wedges occupy space at the tube edges, they destroy laser efficiency just as effectively as condensed metal vapor. The wedges should therefore be designed with two important constraints in mind. First, they should circumscribe as little of the tube perimeter as possible. Certainly, the wedges will not encompass the entire plasma tube wall. Preferably, the angle $\theta$ shown in FIG. 1B should be in the range of 50 to 100 degrees with the most preferred arc being between 60 and 80 degrees. Second, the wedge's angle of inclination $\alpha$ shown in FIG. 1A is preferably as small as possible to permit the metal beads to roll. For copper vapor lasers, a suitable arc is in the range of 1 to 2 degrees. By way of example, in a 1.625 inch diameter plasma tube, a suitable wedge designed under these constraints might be six inches in length and reach a height of 0.25 inches at the plasma tube end, while it covers an arc of 70 degrees.

Thus far the wedges have been discussed as if they were separate inserts (as shown in FIG. 1 and 2). However, this need not always be the case. In an alternative embodiment of the invention, the wedges are formed integrally with the plasma tube itself. It is envisioned that in this embodiment the tube and wedges will be formed simultaneously, thus avoiding the need to insert separate wedges after the tube is made. This embodiment dispenses with the aforementioned concern, described above, that the shapes of the wedges and the plasma tube be complementary.

Figure 3A:
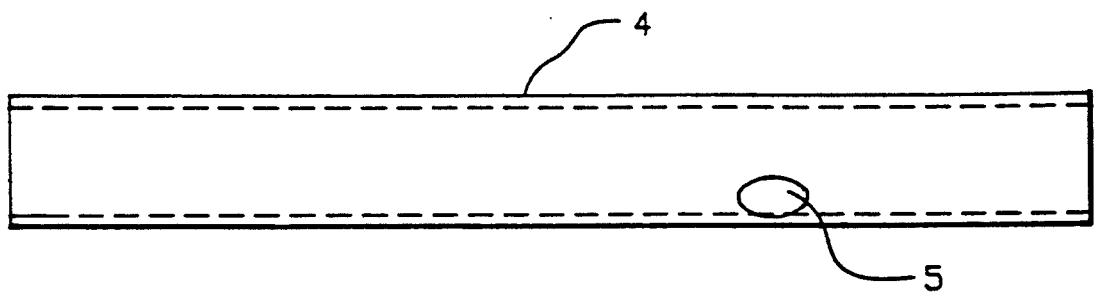
FIG. 3A is an axial section view of a conventional metal vapor plasma tube.
Figure 3B:
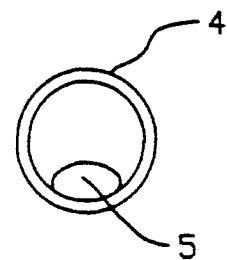
FIG. 3B is a cross section view of a conventional metal vapor plasma tube.
Figure 5:
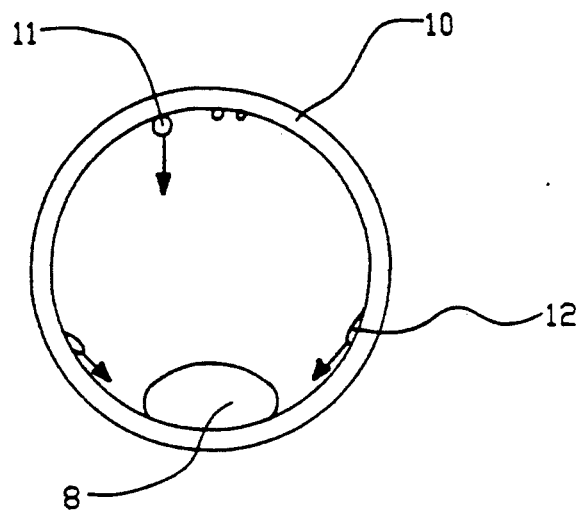
FIG. 5 is a cross section view of a conventional plasma tube showing sissle drops accumulating in a bead at the bottom of the plasma tube.

The problems of conventional tubes are highlighted in FIGS. 3 and 5. FIGS. 3A and 3B show a conventional plasma tube 4 in which no wedges are present. Again, a lump of solid metal 5 is placed within the plasma tube before the laser is put into use.

Figure 4:
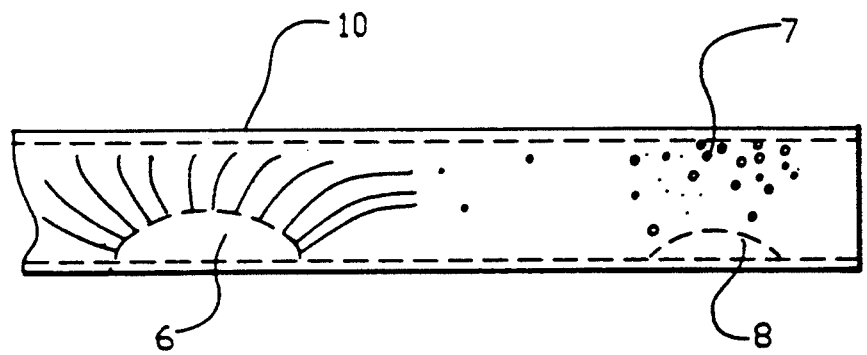
FIG. 4 is an axial section view of a conventional plasma tube showing the locations of metal condensation and vaporization.

FIG. 4 is a representation of the various conditions of a metal within the plasma tube during lasing. In general, a large bead of metal 6 at the center of the tube will continue to vaporize so long as there is a source of heat, such as an arc discharge, present. The vapor ultimately diffuses throughout the entire tube volume. Some of this vapor will ultimately condense and form droplets 7 (called sissle drops). These typically deposit on the sides and ends of the tube. Ultimately the sissle drops make their way to the bottom of the plasma tube where they form a bead 8.

FIG. 5 shows the different pathways sissle drops might travel to reach the bottom of the plasma tube. Some of these drops 11 fall from the top of the plasma tube, while others 12 simply roll down its side. Although sissle drops form throughout the length of the tube, their ultimate disposition depends in large part upon the wedges within the plasma tube. This is because the two ends of the plasma tube are somewhat cooler than the midsection and, consequently, the beads 8 at the terminal ends of a tube cannot vaporize as quickly as those in the center. Thus, some of the beads collect at the ends of the tube. In the absence of any mechanism to transport the beads back to the center, they will grow and form an accumulation of condensed metal at the plasma tube ends.

Figure 6:
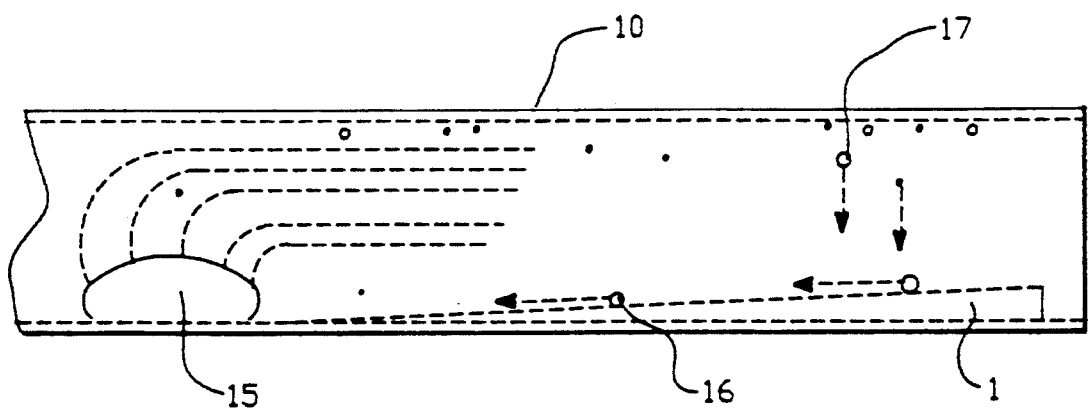
FIG. 6 is an axial section view of the present invention showing condensed metal vapor beads moving back toward the center of the plasma tube foe revaporization.

In FIG. 6, the advantages of the present invention are shown. Here, the sissel drops 17 form beads 16 at the bottom of plasma tube 10, roll down wedges 1 and return to the center of the tube. Thus, the wedges are responsible for setting up a cycle of vaporization in which the metal condensing on the edges is transported back towards the middle of the laser tube for reuse. In essence, the beads of metal 16 forming at the ends of the plasma tube roll toward the center under the force of gravity. Once the beads reach the center of the tube they are heated, and the metal is once again vaporized.

As is apparent from the above discussion, the wedges serve to keep the material being lased, e.g., copper, within the most active or "hot" region of the plasma tube. This is possible because many metals in the liquid state tend to be relatively non-wetting. Hence they do not adhere to the inside surface of a plasma tube, instead they form beads (as shown in the figures discussed above) which are capable of sliding down the walls of the tube. Experiments confirm that copper does not wet the surface of a plasma tube, but collects as beads on the tube's inner circumference. These beads were observed to grow throughout condensation until they either fell from the top of the tube or rolled down the sides. Either way, they accumulated at the bottom of the plasma tube.

Two forces influence the equilibrium condition of a metal drop: (1) gravity which tries to drive the beads to a lower position, and (2) surface tension which tends to oppose this movement. For copper, it has been found that the combination of non-wettability, high surface tension, and low viscosity can be exploited to prevent accumulation at the ends of the plasma tubes. In short, these physical properties allow copper and similar metals to slide or roll with ease under the influence of gravity.

Other techniques which facilitate bead rolling, such as grooves on the wedges and tube, may be employed with the present invention. Also, the chosen wedge material should be one which does not adhere to molten copper or whatever lasing metal is used.

Although only a few embodiments of the present invention have been described herein, it should be understood that the present invention may be embodied in many other specific forms without departing from the spirit or scope of the invention. Particularly, it should be appreciated that the actual lasing media used, and the components of the laser itself, may be widely varied. Similarly, the material that forms the plasma tube and/or the wedges may be widely varied without departing from the invention. Therefore, the present examples and embodiments are to be considered as illustrative and not restrictive. Moreover, the invention is not to be limited to the details given herein, but may be modified within the scope of the appended claims.

What is claimed is:

1. A metal vapor laser comprising:
   an elongated plasma tube having a substantially constant internal diameter and top and bottom sides;
   a pair of arcuate wedges positioned on the bottom side of opposite ends of said plasma tube for recirculating condensed metal towards the center of the plasma tube, said wedges facing one another such that each wedge slopes downward towards the opposing wedge; and
   vaporizing means for vaporizing a lasing media disposed within the plasma tube to induce lasing.

2. A metal vapor laser as recited in claim 1 wherein copper is the lasing media.

3. A metal vapor laser as recited in claim 1 wherein the slope of the wedges are in the range of 1 to 2.5 degrees.

4. A metal vapor laser as recited in claim 1 wherein the wedges comprise inserts placed within the plasma tube.

5. A metal vapor laser as recited in claim 1 wherein the wedges are formed integrally with the plasma tube.

6. A metal vapor laser as recited in claim 1 wherein the wedges have a plurality of grooves on their top surfaces to facilitate the transport of condensed lasing media towards the center of the plasma tube.

7. A metal vapor laser as recited in claim 1 wherein the wedges circumscribe an arc on the inner perimeter of said plasma tube, said arc having an angle of less than 100 degrees.

* * * * *